(12) United States Patent
Long et al.

(10) Patent No.: US 8,744,697 B2
(45) Date of Patent: Jun. 3, 2014

(54) VARIATOR LOCKOUT VALVE SYSTEM

(75) Inventors: Charles F. Long, Pittsboro, IN (US);
Darren J. Weber, Indianapolis, IN (US);
John William Edward Fuller, Preston (GB)

(73) Assignee: Allison Transmission, Inc., Indianapolis, IN (US)

( * ) Notice: Subject to any disclaimer, the term of this patent is extended or adjusted under 35 U.S.C. 154(b) by 686 days.

(21) Appl. No.: 12/943,363

(22) Filed: Nov. 10, 2010

(65) Prior Publication Data
US 2011/0144872 A1 Jun. 16, 2011

Related U.S. Application Data

(60) Provisional application No. 61/286,974, filed on Dec. 16, 2009.

(51) Int. Cl.
*G06F 7/00* (2006.01)

(52) U.S. Cl.
USPC .......................................... 701/51; 192/3.51

(58) Field of Classification Search
None
See application file for complete search history.

(56) References Cited

U.S. PATENT DOCUMENTS

| | | |
|---|---|---|
| 2,706,419 A | 4/1955 | Kelbel |
| 4,838,126 A | 6/1989 | Wilfinger et al. |
| 4,922,788 A | 5/1990 | Greenwood |
| 5,090,951 A | 2/1992 | Greenwood |
| 5,217,418 A | 6/1993 | Fellows et al. |
| 5,232,414 A | 8/1993 | Fellows et al. |
| 5,242,337 A | 9/1993 | Greenwood |
| 5,263,907 A | 11/1993 | Fellows |
| 5,308,297 A | 5/1994 | Greenwood |
| 5,308,298 A | 5/1994 | Lambert |
| 5,316,526 A | 5/1994 | Fellows |
| 5,338,268 A | 8/1994 | Greenwood |
| 5,395,292 A | 3/1995 | Fellows et al. |
| 5,401,221 A | 3/1995 | Fellows et al. |
| 5,423,727 A | 6/1995 | Fellows |
| 5,437,204 A | 8/1995 | Person |
| 5,453,061 A | 9/1995 | Fellows |
| 5,521,819 A | 5/1996 | Greenwood |
| 5,564,993 A | 10/1996 | Robinson |

(Continued)

FOREIGN PATENT DOCUMENTS

| | | |
|---|---|---|
| EP | 1876375 A1 | 1/2008 |
| GB | 2440746 | 2/2008 |
| GB | 2455030 | 6/2009 |
| WO | 97/40292 | 10/1997 |

OTHER PUBLICATIONS

U.S. Appl. No. 61/286,984, filed Dec. 16, 2009, Long et al.
U.S. Appl. No. 61/287,031, filed Dec. 16, 2009, Long et al.

(Continued)

*Primary Examiner* — John R Olszewski
*Assistant Examiner* — Navid Ziaeianmehdizadeh
(74) *Attorney, Agent, or Firm* — Barnes & Thornbug LLP

(57) ABSTRACT

A variator lockout valve system for a continuously variable transmission includes a pair of shift valves. Each shift valve has at least one port that is fluidly coupled to a variator of the continuously variable transmission. Electro-hydraulic actuators control the position of each of the shift valves. When the shift valves are in one position, pressure control valves supply fluid pressure to the variator. If one of the shift valves is in another position, one of the pressure control valves is blocked from supplying fluid pressure to the variator.

18 Claims, 6 Drawing Sheets

(56) References Cited

U.S. PATENT DOCUMENTS

| | | | |
|---|---|---|---|
| 5,564,998 A | 10/1996 | Fellows | |
| 5,643,121 A | 7/1997 | Greenwood et al. | |
| 5,667,456 A | 9/1997 | Fellows | |
| 5,766,105 A | 6/1998 | Fellows et al. | |
| 5,820,508 A | 10/1998 | Konig et al. | |
| 5,820,513 A | 10/1998 | Greenwood | |
| 5,895,337 A | 4/1999 | Fellows et al. | |
| 5,938,557 A | 8/1999 | Greenwood | |
| 5,971,885 A | 10/1999 | Greenwood et al. | |
| 5,980,420 A | 11/1999 | Sakamoto et al. | |
| 6,030,310 A | 2/2000 | Greenwood et al. | |
| 6,066,067 A | 5/2000 | Greenwood | |
| 6,071,209 A | 6/2000 | Greenwood | |
| 6,273,839 B1 | 8/2001 | Dutson | |
| 6,292,732 B1 | 9/2001 | Steinmetz et al. | |
| 2,361,510 A1 | 10/2001 | Smith et al. | |
| 6,306,060 B1 | 10/2001 | Dutson et al. | |
| 6,312,356 B1 | 11/2001 | Greenwood | |
| 6,364,811 B1 | 4/2002 | Hubbard et al. | |
| 2,368,618 A1 | 5/2002 | Greenwood et al. | |
| 6,464,614 B2 | 10/2002 | Dutson | |
| 2,384,531 A1 | 7/2003 | Greenwood | |
| 6,585,617 B1* | 7/2003 | Moorman et al. | 475/119 |
| 6,626,793 B1 | 9/2003 | Greenwood | |
| 6,666,791 B1 | 12/2003 | Greenwood | |
| 2,397,630 A1 | 7/2004 | Greenwood | |
| 6,835,147 B2 | 12/2004 | Iwata et al. | |
| 2,410,302 A1 | 7/2005 | Greenwood | |
| 6,979,276 B2 | 12/2005 | Murray | |
| 2,418,235 A1 | 3/2006 | Winter | |
| 7,018,320 B2 | 3/2006 | Robinson et al. | |
| 7,056,261 B2 | 6/2006 | Fuller | |
| 7,140,993 B2* | 11/2006 | Long et al. | 475/119 |
| 7,160,226 B2 | 1/2007 | Fuller | |
| 7,278,951 B2 | 10/2007 | Fuller | |
| 2,438,412 A1 | 11/2007 | Fuller | |
| 7,318,786 B2 | 1/2008 | Greenwood et al. | |
| 7,407,459 B2 | 8/2008 | Greenwood et al. | |
| 7,491,149 B2 | 2/2009 | Greenwood et al. | |
| 7,530,916 B2 | 5/2009 | Greenwood | |
| 7,563,194 B2 | 7/2009 | Murray | |
| 2,459,857 A1 | 11/2009 | Oliver et al. | |
| 2,460,237 A1 | 11/2009 | Greenwood | |
| 7,614,973 B2 | 11/2009 | Parthuisot | |
| 7,625,309 B2 | 12/2009 | Fuller | |
| 7,632,208 B2 | 12/2009 | Greenwood et al. | |
| 7,637,841 B2 | 12/2009 | Dutson | |
| 7,740,556 B2 | 6/2010 | Iwase et al. | |
| 2,470,717 A1 | 12/2010 | Winter | |
| 2,474,870 A1 | 5/2011 | Greenwood et al. | |
| 7,951,041 B2 | 5/2011 | Dutson | |
| 7,955,210 B2 | 6/2011 | Greenwood et al. | |
| 2001/0041642 A1 | 11/2001 | Miyata | |
| 2004/0038773 A1 | 2/2004 | Robinson et al. | |
| 2005/0043138 A1 | 2/2005 | Fuller | |
| 2005/0143216 A1 | 6/2005 | Greenwood et al. | |
| 2005/0176547 A1 | 8/2005 | DeFreitas | |
| 2005/0211295 A1 | 9/2005 | Long et al. | |
| 2006/0142110 A1 | 6/2006 | Greenwood et al. | |
| 2006/0160656 A1 | 7/2006 | Dutson | |
| 2006/0184303 A1* | 8/2006 | Long et al. | 701/51 |
| 2006/0201766 A1* | 9/2006 | Fuller | 192/3.51 |
| 2007/0072736 A1 | 3/2007 | Defreitas et al. | |
| 2007/0112495 A1 | 5/2007 | Murray | |
| 2007/0142163 A1 | 6/2007 | Murray | |
| 2007/0275817 A1 | 11/2007 | Newall | |
| 2008/0085801 A1 | 4/2008 | Sedoni et al. | |
| 2008/0146399 A1 | 6/2008 | Oliver et al. | |
| 2008/0153659 A1 | 6/2008 | Greenwood | |
| 2008/0176709 A1 | 7/2008 | Wu et al. | |
| 2008/0269001 A1 | 10/2008 | Greenwood et al. | |
| 2009/0048054 A1 | 2/2009 | Tsuchiya et al. | |
| 2009/0062065 A1 | 3/2009 | Field et al. | |
| 2009/0075772 A1 | 3/2009 | Ellis et al. | |
| 2009/0203486 A1 | 8/2009 | Murray | |
| 2009/0253552 A1 | 10/2009 | Foster | |
| 2009/0305840 A1 | 12/2009 | Oliver | |
| 2011/0138898 A1 | 6/2011 | Long et al. | |
| 2011/0140017 A1 | 6/2011 | Long et al. | |
| 2011/0143882 A1 | 6/2011 | Long et al. | |
| 2011/0144925 A1 | 6/2011 | Long et al. | |

OTHER PUBLICATIONS

U.S. Appl. No. 61/287,038, filed Dec. 16, 2009, Long et al.
U.S. Appl. No. 61/287,003, filed Dec. 16, 2009, Long et al.
International Search Report and the Written Opinion for International Application No. PCT/US2010/056247, dated Jan. 21, 2011, (10 pages).
Torotrak Full toroidal variator (http://www.torotrak.com/IVT/works/variator.htm) 5 pages (accessed Sep. 24, 2009).
International Search Report and the Written Opinion for International Application No. PCT/US2010/056244, dated Jan. 21, 2011 (6 pages).
International Search Report and Written Opinion for International Application No. PCT/US2010/01058707, dated Feb. 1, 2011 (8 pages).
International Search Report and Written Opinion for International Application No. PCT/US2010/058705, dated Feb. 11, 2011 (12 pages).
International Search Report and Written Opinion for International Application No. PCT/US2010/060032, dated Feb. 11, 2011 (9 pages).

* cited by examiner

VARIATOR LOCKOUT VALVE SYSTEM

This application claims the benefit of U.S. Provisional Patent Application Ser. No. 61/286,974, filed Dec. 16, 2009.

TECHNICAL FIELD

The present disclosure relates generally to vehicle transmissions that have a ratio varying unit, and more particularly, to a variator lockout valve system for a multiple-mode transmission having a ratio varying unit of the full toroidal type.

BACKGROUND

In some vehicle transmissions, a ratio varying unit ("variator") is used to provide a continuous variation of transmission ratio rather than a series of predetermined ratios. These transmissions may be referred to as continuously variable transmissions, infinitely variable transmissions, toroidal transmissions, continuously variable transmissions of the full toroidal race-rolling traction type, or similar terminology. In such transmissions, the variator is coupled between the transmission input and the transmission output via gearing and one or more clutches. In the variator, torque is transmitted by the frictional engagement of variator disks and rollers separated by a traction fluid.

The variator torque is controlled by a hydraulic circuit, which includes hydraulic actuators (i.e., pistons) that apply an adjustable force to the rollers. The force applied by the hydraulic actuator is balanced by a reaction force resulting from the torques transmitted between the surfaces of the variator disks and the rollers. The end result is that in use, each roller moves and precesses to the location and tilt angle required to transmit a torque determined by the force applied by the hydraulic actuators. A difference in the forces applied to the rollers changes the rollers' tilt angle and thus, the variator ratio. A change in the rollers' tilt angle thus results not only in a net torque at the transmission output but could also result in a change in torque direction. The direction of the torque output determines whether the torque application is positive or negative.

Some continuously variable transmissions have multiple operating modes, wherein each operating mode covers a portion of the overall ratio spread of the transmission. Each operating mode is selectable by a clutch that is engaged by the application of hydraulic fluid pressure as commanded by the transmission control unit. A transition between two operating modes involves a synchronous shift, in which there is a momentary overlap between the off-going clutch and the on-coming clutch. This momentary overlap results in a fixed ratio in which power is transmitted independently of the variator.

Prior to a mode transition, the variator ratio moves toward the ratio limit for the off-going mode, but the force applied to the rollers by the hydraulic actuators must be reversed in order to accomplish the transition to the on-coming mode. For example, in a two-mode continuously variable transmission having a low mode and a high mode, a low mode clutch is engaged and a high mode clutch is disengaged when the transmission is operating in the low mode, and when the transmission is operating in the high mode, the high mode clutch is engaged and the low mode clutch is disengaged. In the low mode, torque is produced by hydraulic forces acting on the variator rollers in one direction, and in the high mode, torque is produced by hydraulic forces acting on the variator rollers in the opposite direction (as compared with the low mode operation). Thus, during a mode transition (e.g. from low to high or vice versa), the direction of force applied to the variator rollers by the hydraulic control circuit is reversed, but the clutches ensure continuous power transmission to the transmission output through the synchronous shift.

SUMMARY

According to one aspect of the present disclosure, a variator control circuit includes a first shift valve that is movable from a first position to a second position axially spaced from the first position in a first valve chamber of a hydraulic control circuit for a continuously variable transmission. The first shift valve has a first port in fluid communication with a variator of the continuously variable transmission.

The variator control circuit also includes a first trim valve operable to output variable fluid pressure. The first trim valve is fluidly coupled to the first port when the first shift valve is in the first position, and the first trim valve is disconnected from the first port when the first shift valve is in the second position.

The variator control circuit also includes a second shift valve that is movable from a first position to a second position axially spaced from the first position in a second valve chamber of the hydraulic control circuit of the continuously variable transmission. The second shift valve has a second port in fluid communication with the variator of the continuously variable transmission.

The variator control circuit also includes a second trim valve operable to output variable fluid pressure. The second trim valve is fluidly coupled to the second port when the second shift valve is in the first position, and the second trim valve is disconnected from the second port when the second shift valve is in the second position.

In some embodiments, the first position of the first shift valve is a destroked position and the second position of the first shift valve is a stroked position. Similarly, the first position of the second shift valve may be a destroked position and the second position of the second shift valve may be a stroked position.

The first shift valve may include a first valve head, a first land adjacent the first valve head and a second land axially spaced from the first land to define the first port. The first shift valve may include a third land axially spaced from the second land and a first spring chamber adjacent the third land. Similarly, the second shift valve may include a second valve head and a second spring chamber axially spaced from the second valve head, where the second port is adjacent the second valve head.

The variator control circuit may include a first passage fluidly coupling the first valve head and the second spring chamber. The variator control circuit may also include a second passage fluidly coupling the second valve head and the first spring chamber.

The variator control circuit may include a first electro-hydraulic actuator having an actuated state and a deactuated state, where the first electro-hydraulic actuator is operable to move the first shift valve from the first position to the second position and to move the second shift valve from the second position to the first position when the first electro-hydraulic actuator is in the actuated state. The first electro-hydraulic actuator may output fluid pressure to both the valve head of the first shift valve and the spring chamber of the second shift valve when the first electro-hydraulic actuator is in the actuated state.

The variator control circuit may also include a second electro-hydraulic actuator having an actuated state and a deactuated state, where the second electro-hydraulic actuator is operable to move the second shift valve from the first position to the second position and to move the first shift valve from the second position to the first position when the second electro-hydraulic actuator is in the actuated state. The second electro-hydraulic actuator may output fluid pressure to both the valve head of the second shift valve and the spring chamber of the first shift valve when the second electro-hydraulic actuator is in the actuated state.

According to another aspect of this disclosure, a variator control circuit includes a first shift valve that is movable from a first position to a second position axially spaced from the first position in a first valve chamber of a hydraulic control circuit for a continuously variable transmission. The first shift valve has a first port in fluid communication with a variator of the continuously variable transmission.

The variator control circuit also includes a first trim valve operable to output variable fluid pressure, where the first trim valve is fluidly coupled to the first port when the first shift valve is in the first position, and the first trim valve is disconnected from the first port when the first shift valve is in the second position.

The variator control circuit also includes a second shift valve that is movable from a first position to a second position axially spaced from the first position in a second valve chamber of the hydraulic control circuit of the continuously variable transmission. The second shift valve has a second port in fluid communication with the variator of the continuously variable transmission.

The variator control circuit also includes a second trim valve operable to output variable fluid pressure, where the second trim valve is fluidly coupled to the second port when the second shift valve is in the first position, and the second trim valve is disconnected from the second port when the second shift valve is in the second position.

The variator control circuit also includes a third source of variable fluid pressure couplable to either the first port or the second port.

The variator control circuit may include a fluid passage coupled to the output of the third source of variable fluid pressure, where the fluid passage is coupled to the first port when the first shift valve is in the second position. The fluid passage may be coupled to the second port when the second shift valve is in the second position.

The variator control circuit may include a third shift valve fluidly coupled to the third source of variable fluid pressure, where the third shift valve has a first position and a second position axially spaced from the first position, the third source of variable fluid pressure outputs fluid pressure to either the first port or the second port when the third shift valve is in the first position and the third source of variable fluid pressure does not output fluid pressure to either the first port or the second port when the third shift valve is in the second position.

In some embodiments, the first position of the first shift valve is a destroked position and the second position of the first shift valve is a stroked position. Similarly, in some embodiments, the first position of the second shift valve is a destroked position and the second position of the second shift valve is a stroked position.

According to another aspect of this disclosure, a variator trim system control method is executable by an electronic control unit of a continuously variable transmission. The method includes detecting a first operating mode of the transmission, blocking a first trim valve from supplying fluid pressure to a variator of the continuously variable transmission in response to detecting the first operating mode, detecting a second operating mode of the transmission, and blocking a second trim valve from supplying fluid pressure to the variator in response to detecting the second operating mode.

The method may include unblocking the first trim valve in response to detecting the second operating mode. In some embodiments, the method may include detecting a third operating mode and unblocking both of the first and second trim valves to allow the first and second trim valves to supply fluid pressure to the variator in the third operating mode. The first and second operating modes may be variable-ratio modes and the third operating mode may be a fixed-ratio mode.

According to yet another aspect of this disclosure, a variator trim system failure recovery method is executable by an electronic control unit of a continuously variable transmission. The method includes monitoring the operation of a trim valve configured to supply variable fluid pressure to a variator of the continuously variable transmission, detecting a failure of the trim valve, blocking the trim valve from supplying variable fluid pressure to the variator in response to detecting the failure, and actuating an alternative source of fluid pressure to supply variable fluid pressure to the variator in response to detecting the failure of the trim valve.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In figures that depict schematic illustrations, the components may not be drawn to scale, and lines shown as connecting the various blocks and components shown therein represent connections which, in practice, may include one or more electrical, mechanical and/or fluid connections, passages, communication links, couplings or linkages, as will be understood by those skilled in the art and as described herein. In general, like structural elements on different figures refer to identical or functionally similar structural elements, although reference numbers may be omitted from certain views of the drawings for ease of illustration.

DETAILED DESCRIPTION

Aspects of this disclosure are described with reference to illustrative embodiments shown in the accompanying drawings and described herein. While the disclosure refers to these illustrative embodiments, it should be understood that the present invention as claimed is not limited to the disclosed embodiments. For example, while certain aspects of the disclosure are discussed herein in the context of a continuously variable transmission, it will be understood by those skilled in the art that aspects of the present disclosure are applicable to other types and configurations of transmissions.

Also, transmissions of the type discussed herein may be referred to by a number of different terms, including continuously variable transmissions, infinitely variable transmissions, toroidal transmissions, continuously variable transmissions of the full toroidal race-rolling traction type, or similar terminology. In this disclosure, for ease of discussion, the term "continuously variable transmission" is used to refer to any of those types of transmissions in which the ratios may be controlled by a ratio varying unit, alternatively or in addition to being controlled by a set of gears that provide fixed, stepped ratios.

Figure 1A:
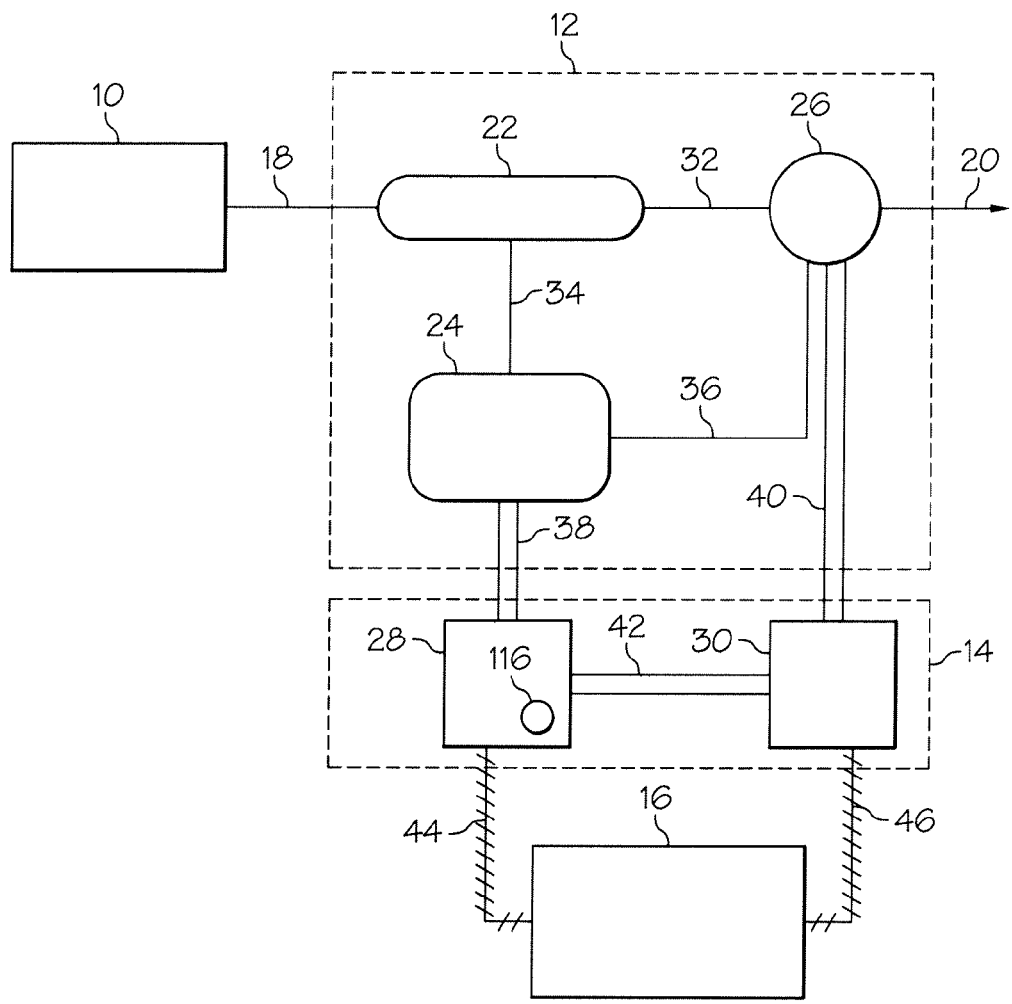
FIG. 1A is a schematic showing a variator lockout valve system in the context of an exemplary vehicle transmission.

In FIG. 1A, a variator lockout valve system 116 is shown in relation to other components of a vehicle power train. The variator lockout valve system 116 is used in a hydraulic control circuit 28 for a transmission 12. In the illustrations, the transmission 12 is a transmission having a ratio varying unit of the full toroidal traction type. Transmissions of this type are available from Torotrak Development, Ltd. of Lancashire, United Kingdom, for example.

The transmission 12 is coupled to a transmission input shaft 18 to receive torque output by a vehicle drive unit 10. The drive unit 10 includes an internal combustion engine, such as a spark-ignited engine or diesel engine, an engine-electric motor combination, or the like.

The transmission 12 uses a ratio varying unit ("variator") 24 to provide a continuous variation of transmission ratio. The variator 24 is coupled between the transmission input shaft 18 and the transmission output shaft 20 via gearing 22 and one or more clutches 26. The linkages 32, 34, 36 are used to schematically represent mechanical connections between components of the transmission 12, as will be understood by those skilled in the art. The linkage 36 is representative of a variator output shaft.

Figure 1B:
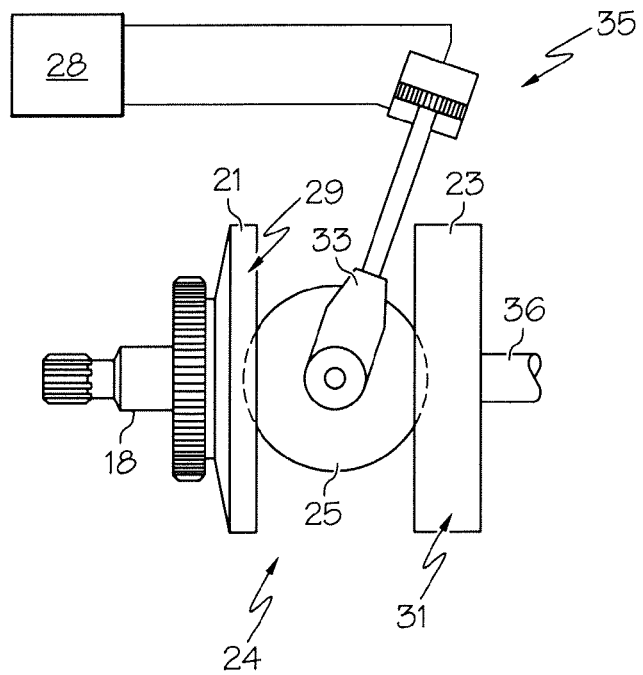
FIG. 1B is a partially schematic simplified side view of a portion of a variator suitable for use in the transmission of FIG. 1A.
Figure 1C:
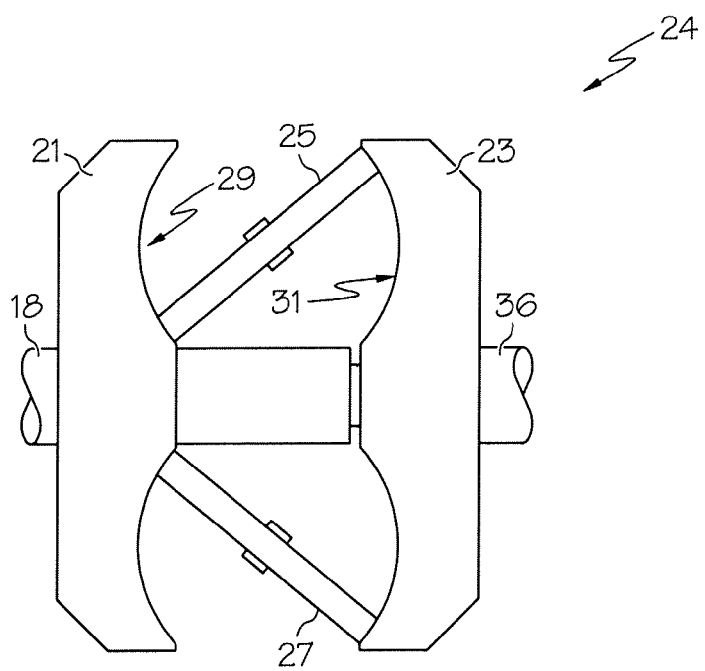
FIG. 1C is a simplified top view of the variator of FIG. 1B, with portions omitted for clarity.

FIGS. 1B and 1C illustrate components of the variator 24. Inside the variator 24, there is a pair of disks 21, 23. The input disk 21 is coupled to and driven by the transmission input shaft 18, while the output disk 23 is coupled to the variator output shaft 36. The space between the inner surfaces 29, 31 of the disks 21, 23 forms a hollow doughnut shape or 'toroid.' A number of rollers 25, 27 are positioned within the toroidal space defined by the surfaces 29, 31. The rollers 25, 27 transmit drive from the input disk 21 to the output disk 23 via a traction fluid (not shown).

Each of the rollers 25, 27 is coupled to a hydraulic actuator 35 by a carriage 33. The hydraulic pressure in the actuators 35 is adjusted by the variator control circuit 28 as described below with reference to FIG. 2. Varying the pressures in the actuators 35 changes the force applied by the actuators 35 to their respective rollers 25, 27, to create a range of torque within the variator 24. The rollers 25, 27 are capable of translational motion and also rotate about a tilt axis relative to the variator disks 21, 23. FIG. 1C shows an example of the rollers 25, 27 positioned at a tilt angle relative to the surfaces 29, 31, with the actuators 35 omitted for clarity.

In one illustrative implementation, the variator 24 includes two pairs of input and output disks 21, 23, and there are three rollers positioned in the toroidal space defined by the disks of each pair, for a total of six rollers. Each roller is coupled to a hydraulic actuator 35, for a total of six hydraulic actuators. These additional disks, rollers, and actuators are omitted from the drawings for clarity.

The variator lockout valve system 116 may be used with other variator implementations, as well. Alternative embodiments of the variator 24 may include a lesser or greater number of disks, rollers, and/or actuators. In one such embodiment, one hydraulic actuator is used to control all of the rollers. In another embodiment, a compact lever arrangement is used in place of the inline piston design shown in FIG. 1B. Moreover, some embodiments may use a partially toroidal rather than a full toroidal configuration.

In one embodiment of the transmission 12, the gearing 22 includes an input gearset and a planetary gearset, and the transmission 12 has three clutches 26 (e.g., C1, C2, C3). The gearing 22 and the clutches 26 are arranged to provide three modes of operation (e.g., M1, M2, M3). In mode M1, forward or reverse launch and speeds up to about 10 miles per hour are possible. In mode M2, speeds in the range of about 10-30 miles per hour are possible, in the forward direction. In mode M3, speeds in the range of about 30 miles per hour or higher are possible, in the forward direction.

Each of the modes is controlled by a separate clutch. The transmission is in mode M1 when the C1 clutch is applied, and in mode M2 when the C2 clutch is applied, and in mode M3 when the C3 clutch is applied. The transition from one mode to another requires one of the clutches to be released and another of the clutches to be applied in a synchronous manner. Also, during a transition from one of the modes M1, M2, M3 to another mode, the variator piston pressures are reversed.

The variator 24 and the clutches 26 of the transmission 12 are controlled by an electro-hydraulic control system 14. The electro-hydraulic control system 14 includes the variator control circuit 28 and a clutch control circuit 30. In general, the linkages 38, 40, 42 represent hydraulic fluid connections between components of the variator 24 and the variator control circuit 28, between the clutch or clutches 26 and the clutch control circuit 30, and between the variator control circuit 28 and the clutch control circuit 30.

The variator control circuit 28 controls the variator ratio. Aspects of the variator control circuit 28 are described below with reference to FIGS. 2-5.

The clutch control circuit 30 controls the application and release of the clutches 26. The clutch control circuit 30 includes a pair of solenoid-controlled shift valves and a pair of pressure control valves (also known as "trim" valves) that are multiplexed to control the application and release of the three clutches C1, C2, C3. One of the shift valves is fluidly coupled to two of the clutches (e.g., C1 and C3) while the other shift valve is fluidly coupled to the third clutch (e.g. C2). Aspects of the clutch control circuit 30 for a three-mode continuously variable ratio transmission like the one described above are the subject of U.S. Provisional Patent Application Ser. No. 61/287,031, filed Dec. 16, 2009, and U.S. Provisional Patent Application Ser. No. 61/287,038, filed Dec. 16, 2009, both of which are incorporated herein by this reference in their entirety.

The operation of the electro-hydraulic control system 14 is controlled by an electronic control unit 16. The linkages 44, 46 are used to schematically represent electrical connections between the electronic control unit 16 and the electro-hydraulic control circuits 28, 30 of the electro-hydraulic control system 14, as will be understood by those skilled in the art. The linkages 44, 46 may include insulated wiring, wireless links, or other suitable connections for exchanging data, communications and computer instructions. The electronic control unit 16 may be implemented as multiple separate logical or physical structures or as a single unit. For example, the electronic control unit 16 may control aspects of the operation of the drive unit 10 in addition to the transmission 12, or the electronic control unit may comprise a number of modules that control different aspects of the operation of the drive unit 10 and/or transmission 12.

The electronic control unit 16 includes computer circuitry configured to control the operation of the transmission 12 based on inputs from various components of the transmission 12 and, in some embodiments, the drive unit 10. Such inputs may include digital and/or analog signals received from sensors, controls or other like devices associated with the vehicle components. The electronic control unit 16 processes inputs and parameters and issues electrical control signals to various components of the electro-hydraulic control system 14.

For example, the electronic control unit 16 monitors the status of valves in the electro-hydraulic control system 14 and detects changes in the operating mode of the transmission 12. Sensing devices such as pressure switches or the like detect changes in valve positions within the electro-hydraulic control system 14 and send electrical signals to the electronic control unit 16 to indicate detected changes. The electronic control unit 16 uses computerized logic and instructions to determine, based on the signals received from the sensing devices, whether a fault has occurred in any of the components of the electro-hydraulic control system 14.

The variator lockout valve system 116 is incorporated into the variator control circuit 28. The variator control circuit 28 applies a controlled force to the variator rollers by adjusting the pressures in the hydraulic actuators 35. As shown schematically in FIG. 2, each of the hydraulic actuators 35 includes a pair of opposing faces 70, 72, which are movable within their respective cylinders 74, 76. Each of the opposing faces 70, 72 is exposed to hydraulic fluid pressure so that the force applied by the actuator 35 to its respective roller is determined by the difference in the two pressures. Accordingly, the force applied by the actuators 35 to the rollers has both a magnitude and a direction. For example, the direction of the force may be considered positive if the face 70 receives greater pressure than the face 72 and negative if the face 72 receives greater pressure than the face 70, or vice versa. Illustratively, each of the hydraulic actuators 35 includes a double-acting piston and cylinder arrangement.

The pressure applied to one side (e.g., the face 70) of the actuator 35 is commonly referred to as "S1," while the pressure applied to the other side (e.g., the face 72) of the actuator 35 is commonly referred to as "S2." The difference between the S1 and S2 pressures determines the force applied by the actuators 35 to their respective rollers.

The actuators 35 and the fluid lines S1, S2 are configured to ensure that the actuators 35 all react the same way, so that all of the rollers 25 of the variator 24 are continuously maintained at the same pressure differential. A "higher pressure wins" valve 78 connects whichever of the two lines S1, S2 is at a higher pressure to an end load arrangement 80.

The variator control circuit 28 adjusts the pressures in the lines S1, S2. A source of hydraulic fluid (i.e., a sump) 68 supplies fluid to a pump 66. Electronically-controlled valves 60, 62, 64 regulate the fluid pressure that is applied to the lines S1 and S2. The valve 64 is a type of pressure control valve commonly referred to as a main modulator valve. The main modulator valve 64 modulates the fluid pressure based on requested torque for the variator control circuit 28.

The valves 60, 62 are trim valves, each of which are includes a variable-bleed solenoid or similar device that outputs a variable fluid pressure in response to signals from the electronic control unit 16. The trim valve 60 is fluidly coupled to a shift valve 50 by a fluid passage 120, and the trim valve 62 is fluidly coupled to a shift valve 52 by a fluid passage 122. The trim valve 60 controls the application of fluid pressure to the line S1 through the shift valve 50, and the valve 62 controls the application of fluid pressure to the line S2 through the shift valve 52.

Figure 3:
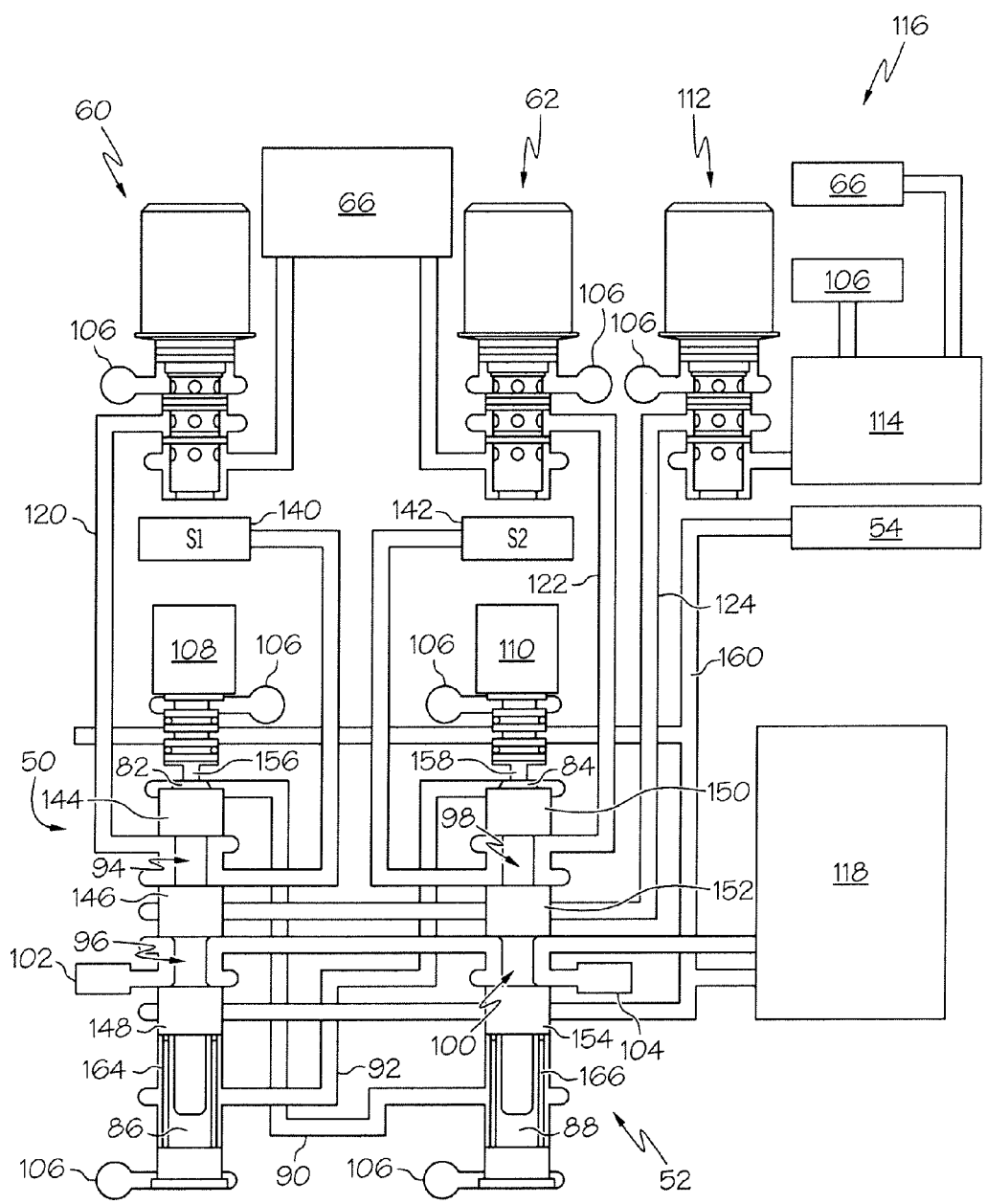
FIGS. 3-5 are schematic representations of different states of the variator lockout valve system of FIG. 1A.
Figure 4:
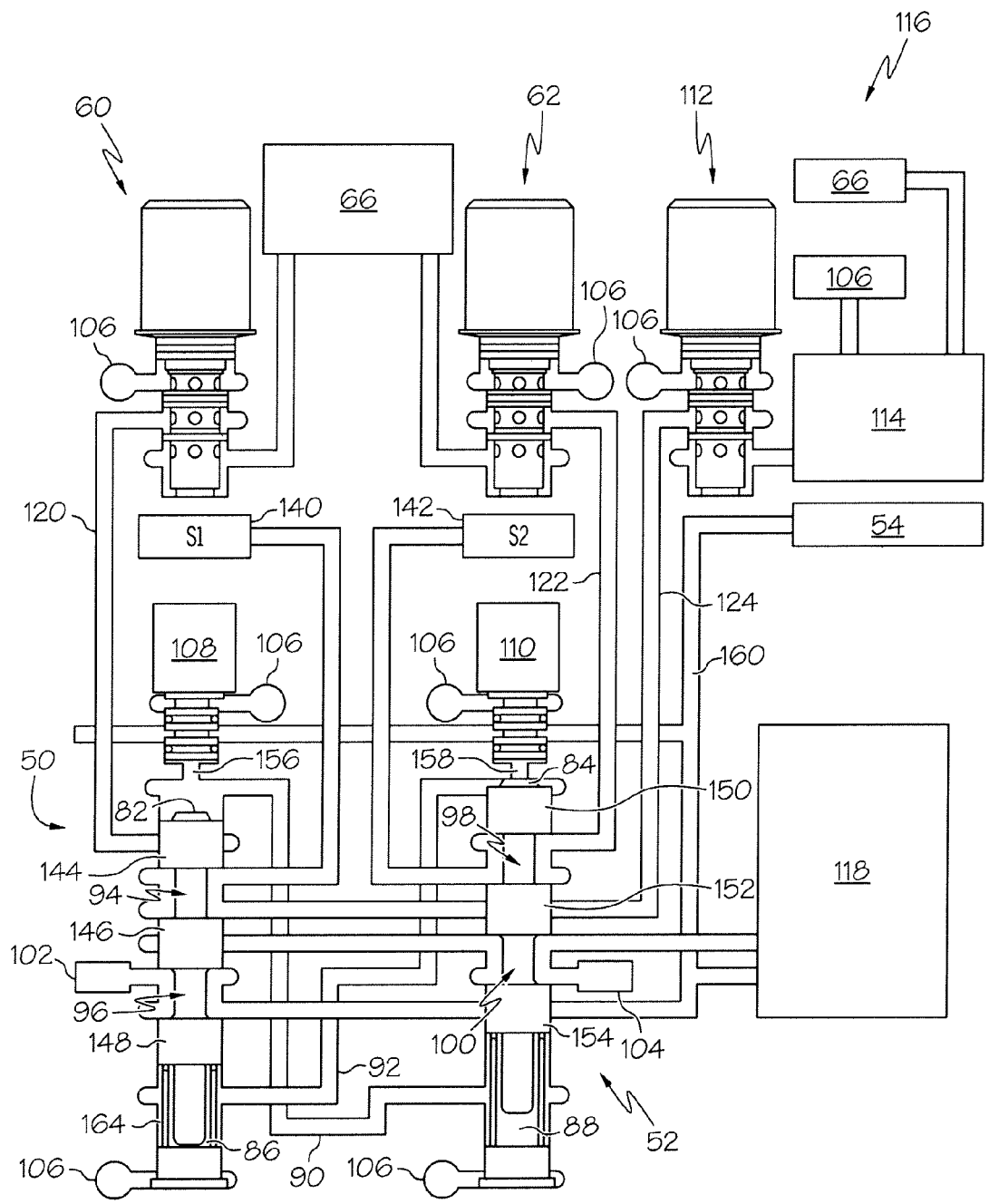
Figure 5:
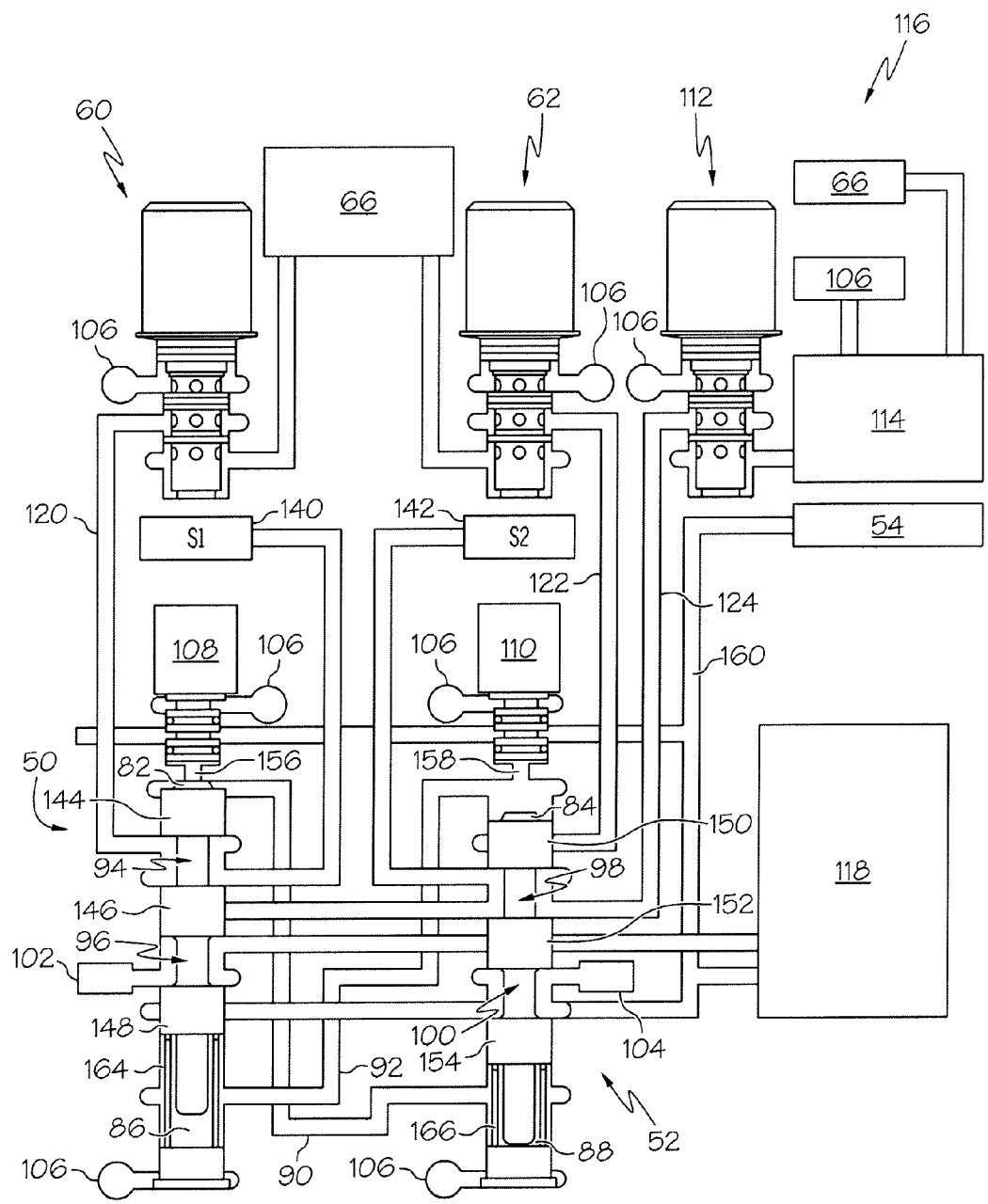

The position of the shift valve 50 determines whether or not the trim valve 60 supplies fluid pressure to the line S1, and the position of the shift valve 52 determines whether or not the trim valve 62 supplies fluid pressure to the line S2. The trim valve 60 is in fluid communication with the line S1 when the shift valve 50 is destroked, as shown in FIGS. 3 and 5 described below. The trim valve 62 is in fluid communication with the line S2 when the shift valve 52 is destroked, as shown in FIGS. 3 and 4 described below.

The variator lockout valve system 116 includes another trim valve 112, and another shift valve 114. The trim valve 112 is fluidly coupled to the shift valves 50, 52 by a fluid passage 124. The trim valve 112 may be used to supply fluid pressure to the line S1 in the event that the trim valve 60 fails, and it may be used to supply fluid pressure to the line S2 in the event that the trim valve 62 fails.

Figure 2:
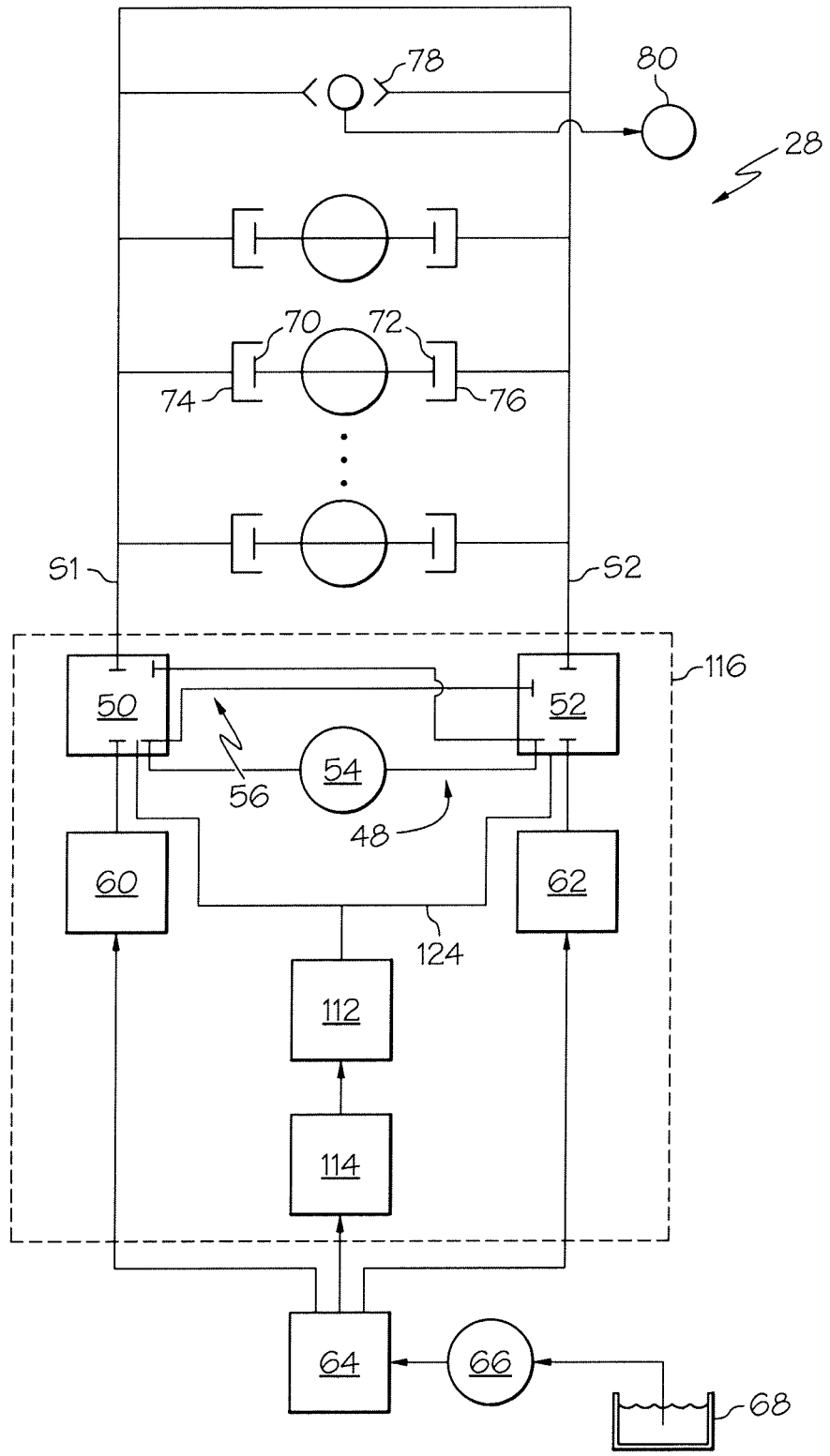
FIG. 2 is a schematic showing the variator lockout valve system of FIG. 1A in a hydraulic control circuit for the transmission of FIG. 1A.

The shift valve 114 controls whether or not the trim valve 112 outputs fluid pressure. The stroking and destroking of the shift valve 114 is controlled by an electro-hydraulic actuator (e.g., an on-off solenoid) as will be understood. In one embodiment, the trim valve 112 outputs fluid pressure when the shift valve 114 is destroked and exhausts when the shift valve 114 is stroked. The shift valve 114 is shown in FIG. 2 as feeding the trim valve 112, however, the shift valve 114 may alternatively be coupled to the output of the trim valve 112. Also, the main modulator valve 64 may be used in place of the trim valve 112, to supply fluid pressure to either of the lines S1, S2, in the event that one of the trim systems 60, 62 fails.

In the disclosed embodiment, the shift valve 114 is multi-plexed to the variator control circuit 28 and the clutch control circuit 30, however, this need not be the case. Aspects of the operation of the shift valve 114 in the clutch control circuit 30 are described in the aforementioned U.S. Provisional Patent Application Ser. Nos. 61/287,031 and 61/287,038.

The variator lockout valve system 116 also includes a fast valve actuation system 48, which is coupled between the trim valves 60, 62 and the rest of the variator control circuit 28. The fast valve actuation system 48 has its own fluid circuit 56, which is coupled to a fluid supply 54. The fluid circuit 56 includes a pair of passages 90, 92, which fluidly couple the respective valve heads and spring pockets of the shift valves 50, 52 to one another as best shown in FIGS. 3-5, described below. In the variator lockout valve system 116, the fast valve actuation system 48 allows the fluid pressure from either the trim system 60 or the trim system 62 to be quickly blocked from reaching the lines S1, S2, respectively, by enabling fast stroking and destroking of the shift valves 50, 52. In this way, the variator lockout valve system 116 may be implemented as a protective measure intended to prevent an unintentional or undesired change in variator torque direction.

Aspects of the fast valve actuation system 48 are described in U.S. Provisional Patent Application Ser. No. 61/287,003, filed Dec. 16, 2009, which is incorporated herein by this reference in its entirety.

FIGS. 3-5 illustrate the three possible states of the variator lockout valve system 116. Each of the shift valves 50, 52 resides in a valve chamber of a valve body of the electro-hydraulic control system 14. The shift valves 50, 52 are axially movable between destroked and stroked positions in their respective valve chambers. The valve chambers are omitted from the drawings for clarity.

The shift valve 50 selectively directs fluid pressure to the fluid passage S1 of a torque transferring mechanism 140 of the automatic transmission. The shift valve 52 selectively directs fluid pressure to the fluid passage S2 of a torque transferring mechanism 142 of the transmission 12. The torque transferring mechanisms 140, 142 are variator roller actuators, or the like, in accordance with the particular design of the transmission 12. As illustrated, the torque transferring mechanisms 140, 142 are the opposing faces 70, 72 of the actuators 35.

The shift valve 50 includes a valve head 82, a spring pocket 86, and a number of axially-spaced lands 144, 146, 148 therebetween. The lands 144, 146, 148 define a pair of ports 94, 96. The spring pocket 86 contains a return spring 164, which biases the shift valve 50 in the destroked position shown in FIGS. 3 and 5.

Similarly, the shift valve 52 includes a valve head 84, a spring pocket 88, and a number of axially-spaced lands 150, 152, 154 therebetween. The lands 150, 152, 154 define a pair of ports 98, 100. The spring pocket 88 contains a return spring 166, which biases the shift valve 52 in the destroked position shown in FIGS. 3 and 4.

The shift valve 50 is fluidly coupled to an electro-hydraulic actuator 108 by an output passage 156. A source of pressurized hydraulic fluid 54 feeds fluid pressure to the electro-hydraulic actuator 108 through a fluid passage 160. The electro-hydraulic actuator 108 selectively outputs the fluid pressure from the output passage 156 or to an exhaust chamber 106 or to supply passage 160, in response to electrical signals issued by the electronic control unit 16.

In the illustrations, the electro-hydraulic actuator 108 is a normally-low, on-off solenoid valve. When the electro-hydraulic actuator 108 receives electrical input (i.e. current or voltage) from the electronic control unit 16 (i.e., the electro-hydraulic actuator 108 is "actuated"), the electro-hydraulic actuator 108 outputs fluid pressure from the passage 160 to the output passage 156. In the absence of electrical input, the electro-hydraulic actuator 108 directs fluid pressure from the passage 156 to the exhaust chamber 106. When the electro-hydraulic actuator 108 is actuated, fluid pressure applied to the valve head 82 via the output passage 156 strokes the shift valve 50 as shown in FIG. 4.

In a similar fashion to the shift valve 50, the shift valve 52 is fluidly coupled to an electro-hydraulic actuator 110 by an output passage 158. The source of pressurized hydraulic fluid 54 feeds fluid pressure to the electro-hydraulic actuator 110 through the fluid passage 160. The electro-hydraulic actuator 110 selectively outputs fluid pressure to passage 158 to an exhaust chamber 106 or supply passage 160, in response to electrical signals issued by the electronic control unit 16.

In the illustrations, the electro-hydraulic actuator 110 is a normally-low, on-off solenoid valve. When the electro-hydraulic actuator 110 receives electrical input from the electronic control unit 16 (i.e., the electro-hydraulic actuator 110 is "actuated"), the electro-hydraulic actuator 110 outputs fluid pressure from the passage 160 to the output passage 158. In the absence of electrical input, the electro-hydraulic actuator 110 directs fluid pressure from the passage 158 to an exhaust chamber 106. When the electro-hydraulic actuator 110 is actuated, fluid pressure applied to the valve head 84 via the output passage 158 strokes the shift valve 52 as shown in FIG. 5.

The electro-hydraulic actuators 108, 110 may include one or more orifices that moderate the rate of fluid flow through the actuators 108, 110, respectively, i.e. to control the rate at which the fluid pressure changes. These orifices are omitted from the drawings for clarity.

As shown in FIGS. 3-5, the port 94 of the shift valve 50 is in fluid communication with the fluid passage S1 of the torque transferring mechanism 140 both when the shift valve 50 is destroked and when the shift valve 50 is stroked. Similarly, the port 98 of the shift valve 52 is in fluid communication with the fluid passage S2 of the torque transferring mechanism 142 both when the shift valve 52 is destroked and when the shift valve 52 is stroked.

The trim systems 60, 62, and 112 are selectively in fluid communication with the fluid passages S1, S2, depending upon the position of the shift valves 50, 52. The trim system 60 is configured to control the application of fluid pressure to the fluid passage S1 when the shift valve 50 is destroked. The trim system 62 is configured to control the application of fluid pressure to the fluid passage S2 when the shift valve 52 is destroked.

When the shift valve 50 is stroked, the port 94 is disconnected from the trim system 60, as shown in FIG. 4. Similarly, when the shift valve 52 is stroked, the port 98 is disconnected from the trim system 62, as shown in FIG. 5. The trim system 112 is connected to the fluid passage S1 through the port 94 of the shift valve 50 when the shift valve 50 is stroked. The trim system 112 is connected to the fluid passage S2 through the port 98 of the shift valve 52 when the shift valve 52 is stroked.

The ports 96, 100 of the shift valves 50, 52, are in fluid communication with pressure switches 102, 104, respectively, and with a variator fault valve 118. The port 96 (and thus, the pressure switch 102) is pressurized when the shift valve 50 is stroked or when the shift valve 50 is destroked and the variator fault valve 118 is destroked. The port 100 (and thus, the pressure switch 104) is pressurized when the shift valve 52 is stroked or when the shift valve 50 is destroked and the variator fault valve 118 is destroked. The variator fault valve 118 is a two-position valve that is normally stroked, but destrokes if the variator pressure output to the end load arrangement 80 is too high, i.e. equal to the main supply pressure.

When pressurized, the pressure switches 102, 104 send electrical signals to the electronic control unit 16. An application of the pressure switches 102, 104 and the variator fault valve 118 for diagnostic purposes is the subject of U.S. Provisional Patent Application Ser. No. 61/286,984, filed Dec. 16, 2009, which is incorporated herein by this reference in its entirety.

The fast valve actuation system 48 of the variator lockout valve system 116 includes a pair of non-intersecting fluid passages 90, 92. The fluid passage 90 couples the output passage 156 of the electro-hydraulic actuator 108 to valve head 82 of the shift valve 50 and the spring pocket 88 of the shift valve 52. The fluid passage 92 couples the output passage 158 of the electro-hydraulic actuator 110 to the valve head 84 of the shift valve 52 and the spring pocket 86 of the shift valve 50.

In operation, when the electro-hydraulic actuator 108 is actuated (FIG. 4), fluid pressure is output to the valve head 82 of the shift valve 50 and to the spring pocket 88 of the shift valve 52 at the same time, or at nearly the same time. Likewise, when the electro-hydraulic actuator 110 is actuated (FIG. 5), fluid pressure is output to the valve head 84 of the shift valve 52 and to the spring pocket 86 of the shift valve 50 at the same time, or at nearly the same time.

If both of the electro-hydraulic actuators 108, 110 are actuated at the same time (e.g., if one of the electro-hydraulic actuators 108, 110 is actuated, or remains actuated, in error) the fluid pressure directed to the spring pockets 86, 88 via the fluid passages 92, 90 prevents the shift valves 50, 52 from stroking, resulting in a valve state that looks similar to FIG. 3. In other words, each one of the shift valves 50, 52 can only be stroked one at a time.

Thus, the variator lockout valve system 116 only has three possible states: a "00" state in which both of the shift valves 50, 52 are destroked, a "10" state in which the shift valve 50 is stroked and the shift valve 52 is prevented from stroking, and a "01" state in which the shift valve 50 is prevented from stroking and the shift valve 52 is stroked. Actuation of only one of the electro-hydraulic actuators 108, 110 simultaneously causes one of the shift valves 50, 52 to stroke and the other of the shift valves 50, 52 to be blocked from stroking. In this way, the fluid passages 90, 92 help prevent a trim system 60, 62 that is supposed to be unblocked in a normal operating mode from being inadvertently blocked.

Table 1 below illustrates an example mechanization for the normal operation of an electro-hydraulic control system 14, including the variator lockout valve system 116, for a three-clutch continuously variable transmission such as the three-mode transmission described above.

During normal mode transitions (i.e., M1 to M2 or vice versa, or M2 to M3 or vice versa), the variator trim lockout feature is disabled because both of the electro-hydraulic actuators 108, 110 are turned off. This allows the trim valves 60, 62, 112 to feed the lines S1, S2 as required during mode transitions.

If one of the trim systems 60, 62 fails, the electronic control unit 16 will cause the failed trim system to be locked out by actuating the corresponding electro-hydraulic actuator 108, 110 to stroke the corresponding shift valve 50, 52.

In normal operation, the stroked shift valve 114 blocks the backup trim system 112 from outputting fluid pressure. However, if one of the trim systems 60, 62 fails, the electro-hydraulic actuator (e.g. solenoid) controlling the shift valve

TABLE 1

| Mode | Torque | Trim System 60/S1 | Trim System 62/S2 | Trim System 112 (Backup) | Actuator 108/Shift Valve 50 | Actuator 110/Shift Valve 52 | Shift Valve 114 | Clutch(es) Applied |
|---|---|---|---|---|---|---|---|---|
| 0 | None | Off | On/Trim S2 | Blocked | Off/Destroked | Off/Destroked | On/Stroked | None |
| M1 | Negative | On/Trim S1 | Blocked | Blocked | Off/Destroked | On/Stroked | On/Stroked | C1 |
| M1 | Positive | Blocked | On/Trim S2 | Blocked | On/Stroked | Off/Destroked | On/Stroked | C1 |
| M1-M2 Transition | Fixed Gear | On/Trim S1 | On/Trim S2 | Blocked | Off/Destroked | Off/Destroked | On/Stroked | C1, C2 |
| M2 | Negative | Blocked | On/Trim S2 | Blocked | On/Stroked | Off/Destroked | On/Stroked | C2 |
| M2 | Positive | On/Trim S1 | Blocked | Blocked | Off/Destroked | On/Stroked | On/Stroked | C2 |
| M2-M3 Transition | Fixed Gear | On/Trim S1 | On/Trim S2 | Blocked | Off/Destroked | Off/Destroked | On/Stroked | C2, C3 |
| M3 | Negative | On/Trim S1 | Blocked | Blocked | Off/Destroked | On/Stroked | On/Stroked | C3 |
| M3 | Positive | Blocked | On/Trim S2 | Blocked | On/Stroked | Off/Destroked | On/Stroked | C3 |

As shown in Table 1, the variator lockout valve system 116 locks out the variator trim systems (e.g. trim systems 60, 62, 112) that are not implicated in a particular normal operating mode. The locking out of the non-implicated variator trim systems helps prevent inadvertent variator torque reversals while the transmission is operating normally in the selected mode.

For example, when the transmission is operating normally in mode M1 and the variator torque sign is negative, the electro-hydraulic actuator 110 is actuated and the shift valve 52 is stroked. The shift valve 50 is destroked, allowing the trim system 60 to apply variable pressure to the line S1. However, the trim system 62 cannot feed the line S2 because the land 150 of the shift valve 52 blocks the passage 122. As illustrated, the trim system 62 is also blocked when the transmission is operating normally in mode M2 (positive torque) and mode M3 (negative torque). Additionally, when the electro-hydraulic actuator 110 is actuated, the fluid passage 92 directs fluid pressure to the spring chamber 86 of the shift valve 50, which prevents the shift valve 50 from stroking erroneously in these modes.

Similarly, when the transmission is operating normally in mode M1 and the variator torque sign is positive, the electro-hydraulic actuator 108 is actuated and the shift valve 50 is stroked. The shift valve 52 is destroked, allowing the trim system 62 to apply variable pressure to the line S2. However, the trim system 60 cannot feed the line S1 because the land 144 of the shift valve 50 blocks the passage 120. In the illustration, the trim system 60 is also blocked when the transmission is operating normally in mode M2 (negative torque) and mode M3 (positive torque). In addition, when the electro-hydraulic actuator 108 is actuated, the fluid passage 90 directs fluid pressure to the spring chamber 88 of the shift valve 52, which prevents the shift valve 52 from stroking erroneously in these modes.

114 deactuates and the shift valve 114 destrokes. Destroking of the shift valve 114 enables the backup trim system 112 to output variable pressure. The backup trim system 112 can then supply fluid pressure to the locked out variator line (i.e. S1 or S2) in place of the trim system that normally feeds that line. In this way, the electro-hydraulic control system 14 allows the vehicle to continue to operate in the mode that was selected prior to the trim system failure, i.e. "limp home," without the trim system failure resulting in an inadvertent torque reversal.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A variator control circuit, comprising:
a first shift valve movable from a first position to a second position axially spaced from the first position in a first valve chamber of a hydraulic control circuit for a continuously variable transmission, the first shift valve having a first port in fluid communication with a variator of the continuously variable transmission,
a first trim valve operable to output variable fluid pressure, the first trim valve being fluidly coupled to the first port when the first shift valve is in the first position, the first trim valve being disconnected from the first port when the first shift valve is in the second position,
a second shift valve movable from a first position to a second position axially spaced from the first position in a second valve chamber of the hydraulic control circuit of the continuously variable transmission, the second shift valve having a second port in fluid communication with the variator of the continuously variable transmission, and a second trim valve operable to output variable fluid pressure, the second trim valve being fluidly coupled to the second port when the second shift valve is in the first position, the second trim valve being disconnected from the second port when the second shift valve is in the second position.

2. The variator control circuit of claim 1, wherein the first position of the first shift valve is a destroked position and the second position of the first shift valve is a stroked position.

3. The variator control circuit of claim 2, wherein the first position of the second shift valve is a destroked position and the second position of the second shift valve is a stroked position.

4. The variator control circuit of claim 3, wherein the first shift valve comprises a first valve head, a first land adjacent the first valve head and a second land axially spaced from the first land to define the first port.

5. The variator control circuit of claim 4, wherein the first shift valve comprises a third land axially spaced from the second land and a first spring chamber adjacent the third land.

6. The variator control circuit of claim 5, wherein the second shift valve comprises a second valve head and a second spring chamber axially spaced from the second valve head, and the second port is adjacent the second valve head.

7. The variator control circuit of claim 6, comprising a first passage fluidly coupling the first valve head and the second spring chamber.

8. The variator control circuit of claim 7, comprising a second passage fluidly coupling the second valve head and the first spring chamber.

9. The variator control circuit of claim 1, comprising a first electro-hydraulic actuator having an actuated state and a deactuated state, the first electro-hydraulic actuator being operable to move the first shift valve from the first position to the second position and to move the second shift valve from the second position to the first position when the first electro-hydraulic actuator is in the actuated state.

10. The variator control circuit of claim 9, wherein the first shift valve has a valve head and the second shift valve has a spring chamber, and the first electro-hydraulic actuator outputs fluid pressure to both the valve head of the first shift valve and the spring chamber of the second shift valve when the first electro-hydraulic actuator is in the actuated state.

11. The variator control circuit of claim 1, comprising a second electro-hydraulic actuator having an actuated state and a deactuated state, the second electro-hydraulic actuator being operable to move the second shift valve from the first position to the second position and to move the first shift valve from the second position to the first position when the second electro-hydraulic actuator is in the actuated state.

12. The variator control circuit of claim 11, wherein the second shift valve has a valve head and the first shift valve has a spring chamber, and the second electro-hydraulic actuator outputs fluid pressure to both the valve head of the second shift valve and the spring chamber of the first shift valve when the second electro-hydraulic actuator is in the actuated state.

13. A variator control circuit, comprising:
a first shift valve movable from a first position to a second position axially spaced from the first position in a first valve chamber of a hydraulic control circuit for a continuously variable transmission, the first shift valve having a first port in fluid communication with a variator of the continuously variable transmission, a first trim valve operable to output variable fluid pressure, the first trim valve being fluidly coupled to the first port when the first shift valve is in the first position, the first trim valve being disconnected from the first port when the first shift valve is in the second position, a second shift valve movable from a first position to a second position axially spaced from the first position in a second valve chamber of the hydraulic control circuit of the continuously variable transmission, the second shift valve having a second port in fluid communication with the variator of the continuously variable transmission, a second trim valve operable to output variable fluid pressure, the second trim valve being fluidly coupled to the second port when the second shift valve is in the first position, the second trim valve being disconnected from the second port when the second shift valve is in the second position, and a third source of variable fluid pressure couplable to either the first port or the second port.

14. The variator control circuit of claim 13, comprising a fluid passage coupled to the output of the third source of variable fluid pressure, wherein the fluid passage is coupled to the first port when the first shift valve is in the second position.

15. The variator control circuit of claim 14, wherein the fluid passage is coupled to the second port when the second shift valve is in the second position.

16. The variator control circuit of claim 15, comprising a third shift valve fluidly coupled to the third source of variable fluid pressure, wherein the third shift valve has a first position and a second position axially spaced from the first position, the third source of variable fluid pressure outputs fluid pressure to either the first port or the second port when the third shift valve is in the first position and the third source of variable fluid pressure does not output fluid pressure to either the first port or the second port when the third shift valve is in the second position.

17. The variator control circuit of claim 16, wherein the first position of the first shift valve is a destroked position and the second position of the first shift valve is a stroked position.

18. The variator control circuit of claim 17, wherein the first position of the second shift valve is a destroked position and the second position of the second shift valve is a stroked position.

* * * * *